United States Patent

[11] 3,627,334

| [72] | Inventor | Robert R. Reddy<br>1195 Michillinda Blvd., Pasadena, Calif. 91107 |
|---|---|---|
| [21] | Appl. No. | 806,848 |
| [22] | Filed | Mar. 13, 1969 |
| [45] | Patented | Dec. 14, 1971 |

[54] FLUID-SEALING WASHER AND JOINT ASSEMBLY
4 Claims, 3 Drawing Figs.

[52] U.S. Cl. .................................................. 277/166, 277/235 A, 85/1, 151/69
[51] Int. Cl. ............................................. F16b 43/00, F16b 29/00
[50] Field of Search .......................................... 277/166, 235 A, 180, 2; 85/50, 1 JP; 151/69, 38

[56] References Cited

UNITED STATES PATENTS

| 1,478,108 | 12/1923 | Dieter .......................... | 277/235 A |
| 2,520,089 | 8/1950 | Lippincott ..................... | 277/2 |
| 2,672,069 | 3/1954 | Mitchell ....................... | 85/50 X |
| 3,083,023 | 3/1963 | Creavey ....................... | 277/180 X |
| 3,426,819 | 2/1969 | Estes et al. .................. | 151/69 |

FOREIGN PATENTS

| 712,786 | 7/1954 | Great Britain ............... | 277/235 A |
| 1,377,659 | 9/1964 | France ......................... | 277/180 |

*Primary Examiner*—Samuel B. Rothberg
*Attorneys*—D. Gordon Angus and Donald D. Mon ABSTRACT: A washer for making a fluid-type seal between a pair of surfaces. The washer has an opening through it which carries at least a fragment of a thread so as to prevent the washer from falling off the threaded end of a bolt or stud which forms part of a joint assembly. It also includes a pair of opposed parallel planar surfaces, each of which bears a layer of solid elastomeric material, said layers being not less than 0.001 and not greater than 0.004 inches thick, the material of which in such a thin layer has the inherent property of deforming to conform to irregularities in a surface brought against it, but without cold flow.

PATENTED DEC 14 1971 3,627,334
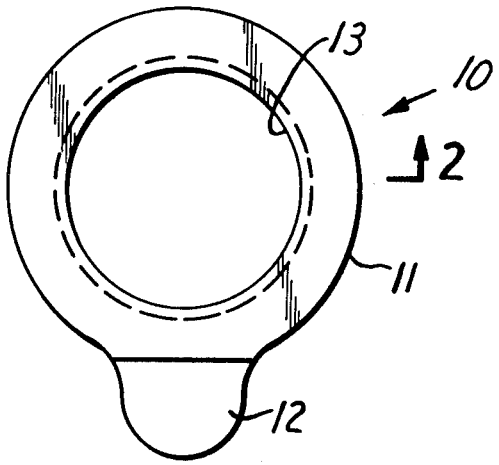
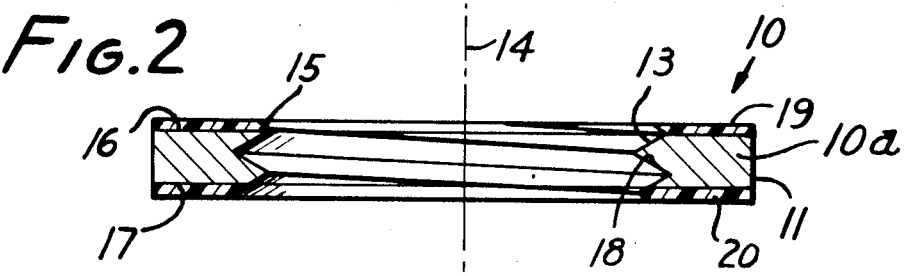
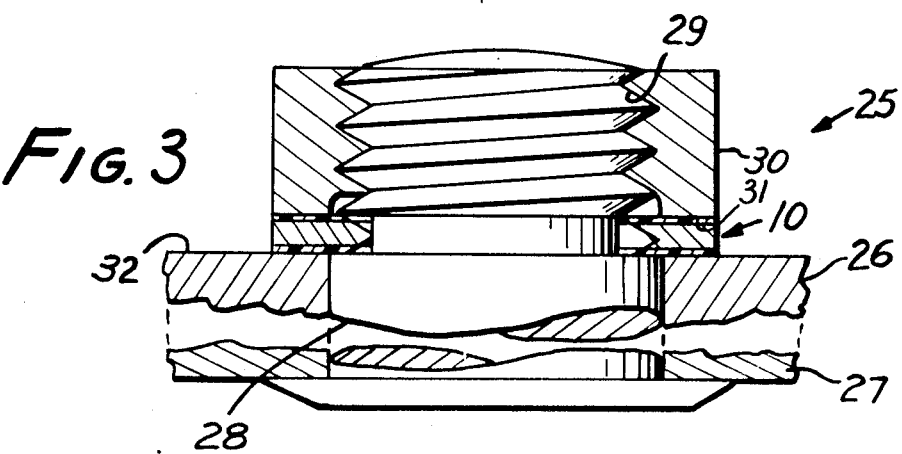
INVENTOR.
ROBERT R. REDDY
BY Angus & Mon
ATTORNEYS.

FLUID-SEALING WASHER AND JOINT ASSEMBLY

This invention relates to a solid washer for sealing between two surfaces, either or both of which surfaces may have surface irregularities which could otherwise prevent the making of a complete fluid seal directly between them.

Washers for the foregoing purpose are well known. For example, coated washers have long been used in the fluid sealing of joints. In general, they incorporate a resilient material, the deflection of which creates a springback force that is intended to create a sealing action resistive to leakage. Such an objective is realistic and attains limited success. However, when joints are tightly assembled, as they need to be when the fluid sealing is accomplished in a structural joint, resilient material may be compressed beyond its yield point and would begin to cold flow until its stresses are relieved. Then the fluid sealing advantages of the joint are lost.

Prior art concepts which have been developed to overcome the foregoing disadvantages have, in general, taken the direction of limiting the forces which can be exerted on the seal itself. Then, of course, a variable is added to the system, namely, the uncertainty that by the time the force-limiting feature exerts its effect, the sealing portion may not yet have performed its own function.

The instant invention takes an entirely different approach to the problem of sealing between two surfaces. It uses a solid washer with a surface layer that is deformable so as to adjust itself to surface irregularities, but which is provided in such thickness and of such material that the layer does not cold flow. Then there need be no force-limiting means. The material will, in fact, deform, but the springback force is not self-relieving. This invention thereby provides the advantages sought by the prior art but without its disadvantages.

With the use of washers of this class, surface properties such as cleanliness are critical, and the physical handling of the washer is a matter of some difficulty, especially when the washer is to be installed in some relatively awkward assembly, such as on a bolt which hangs straight down. This invention provides a simple means for retaining the washer on a threaded member without the need to hold it there while assembling the joint.

The above and other features of this invention will be fully understood from the following detailed description of the accompanying drawings, in which:

FIG. 1 is a plan view of the presently preferred embodiment of the invention;

FIG. 2 is an axial cross section taken at line 2—2 of FIG. 1; and

FIG. 3 is a side view partly in axial cross section of a joint incorporating the invention.

Sealing washer 10 according to the invention is shown in FIGS. 1 and 2. FIG. 1 is a plan view, wherein the washer has a solid metallic body 10a with an outer edge 11 and, if desired, a handling tab 12 on its outer periphery.

An opening 13 extends axially through the washer along a central axis 14 and is defined by a boundary wall 15. The boundary wall extends from surface 16 to surface 17, these surfaces being flat, parallel to each other and normal to the axis.

According to a preferred but optional feature of the invention, at least a fragment 18 of a thread is formed in the boundary wall. As will later be seen, it need not be a full thread convolution, but merely enough of one to hold the washer on a threaded element yet to be described.

A layer 19 is formed on surface 16, and another layer 20 is formed on surface 17, each for the purpose of making a fluid seal. Each layer is made of a solid material adherent to its respective surface, and having the inherent property in thin sections of deforming to conform, but without cold flow, to irregularities in a surface brought against it.

According to the preferred embodiment of the invention, the material has a thickness not greater than 0.004 inch and not less than 0.001 inch. The preferred material is selected from the group consisting of Kel-F and Teflon. Fluoroelastomers and are especially useful because of their resilience at cryogenic temperatures.

A joint 25 is shown assembled utilizing the invention in FIG. 3. A pair of workpieces 26, 27 are joined by a bolt 28, the bolt having a thread 29 projecting beyond the workpieces and engaged with a body 30 which is illustrated as a nut with an abutment surface 31 by which a seal is to be made.

Another abutment surface 32 is formed on workpiece 26. Abutment surfaces 31 and 32 will have sufficient irregularities as to prevent their making a full seal when brought together when the surfaces are made by conventional machining processes. However, with the washer in place, the seal will be made between them by the washer. The solid body material of the washer may be any metal resistant to the materials against which the seal is being made, stainless steel being a common example.

The provision of materials and layers of thickness not subject to cold flow and especially of fluoroelastomers with their additional properties of resistance to cryogenic as well as elevated temperatures, results in a very suitable washer for sealing applications. The inclusion of at least a fragment of a thread enables the device to be handled and be self-retaining on a stud or bolt while the joint is being assembled. The washer is readily manufactured and easy to use.

What is claimed:

1. A sealing washer comprising: an annular solid metallic ring having a central axis, a pair of flat parallel surfaces normal to said central axis, a wall defining an opening extending between said surfaces and spaced from their edges, at least a fragment of a thread in said wall, and a layer adhered to both of said surfaces of a solid material having the inherent property in thin sections of deforming to conform, but without cold flow to irregularities in a surface brought against it, wherein each said layer is a fluoroelastomer having a thickness not greater than 0.004 inch and not less than 0.001 inch.

2. A sealing washer according to claim 1 in which the material is selected from the group consisting of Kel-F and Teflon.

3. In combination: a pair of bodies, each with an abutment surface, a threaded element passing through the bodies, and a washer sandwiched and tightly held between said abutment surfaces comprising: a sealing washer comprising an annular solid metallic ring having a central axis, a pair of flat parallel surfaces normal to said central axis, a wall defining an opening extending between said surfaces and spaced from their edges, at least a fragment of a thread in said wall and engaging the thread adhered to the threaded element, and a layer on both of said surfaces of a solid material having the inherent property in thin sections of deforming to conform, but without cold flow, to irregularities in a surface brought against it, wherein each said layer is a fluoroelastomer having a thickness not greater than 0.004 inches and not less than 0.001 inches.

4. A combination according to claim 3 in which the material is selected from the group consisting of Kel-F and Teflon.

* * * * *